No. 782,065. PATENTED FEB. 7, 1905.
N. S. SHALER.
LIQUID SETTLING TANK.
APPLICATION FILED DEC. 22, 1902. RENEWED DEC. 14, 1904.
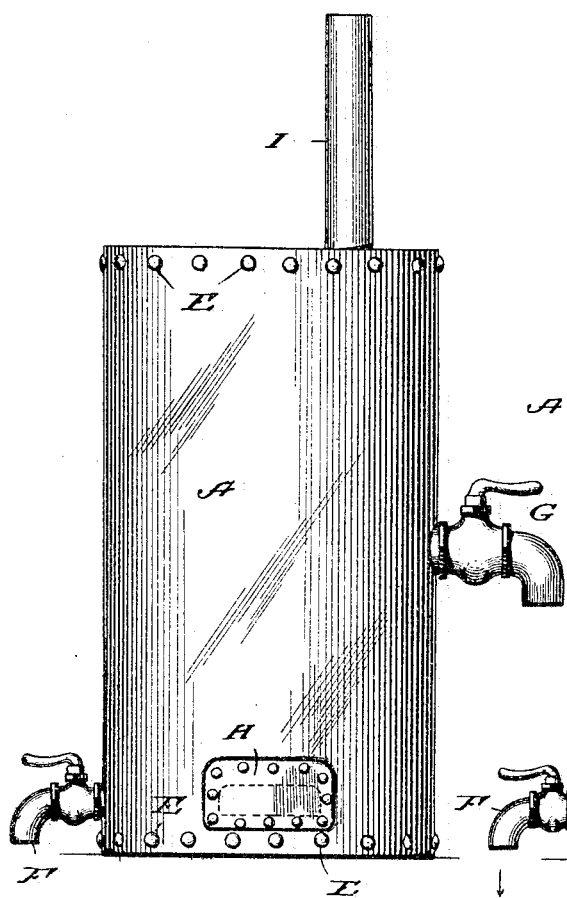
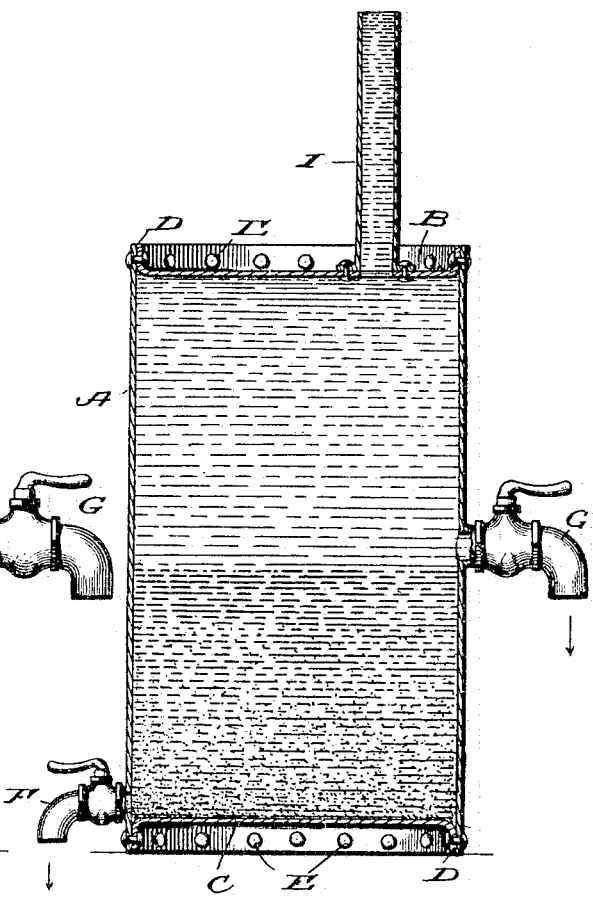
Nathaniel S. Shaler, Inventor No. 782,065. Patented February 7, 1905.

UNITED STATES PATENT OFFICE.

NATHANIEL S. SHALER, OF CAMBRIDGE, MASSACHUSETTS.

LIQUID-SETTLING TANK.

SPECIFICATION forming part of Letters Patent No. 782,065, dated February 7, 1905.

Application filed December 22, 1902. Renewed December 14, 1904. Serial No. 236,856.

*To all whom it may concern:*

Be it known that I, NATHANIEL S. SHALER, a citizen of the United States, residing at Cambridge, in the county of Middlesex and State of Massachusetts, have invented a certain new Liquid-Settling Tank; and I do hereby declare the following to be a full, clear, and exact description of the invention, such as will enable others skilled in the art to which it appertains to make and use the same.

My invention relates to a certain new and useful apparatus for settling muddy water or other liquids on shipboard or wherever the apparatus is subjected to shaking or agitation.

It is well known that water impregnated with earthy matter or other liquids impregnated with foreign matter cannot be caused to settle when the containing vessel is subjected to agitation. This is particularly the case with water-tanks located upon boats or dredges and is due to the fact that in all cases the containing vessels are open or not completely filled, and consequently the contents thereof are subject to such movement or agitation as to cause the impure matter to be held in suspension and not permitted to seek the bottom by gravitation, as would be the case if the fluid were maintained in a state of rest.

My invention has for its object to provide a tank or other fluid-containing vessel which shall permit of the ready settling of any impurities contained in the fluid contents, even though such vessel may be subjected to a shaking action as the result of its particular location.

With these ends in view my invention consists of a closed containing tank or vessel provided with cocks for drawing off the clarified and unclarified portions of liquid and provided also with means for producing an internal pressure in the tank, such pressure serving in connection with the more or less completely filled condition of the tank, being sufficient to cause the particles of water in the tank to maintain in relation with one another a quiescent condition even though the tank and its contents may be subjected to violent agitation with reference to any fixed point in space.

My invention also consists in the details of construction hereinafter described.

In order that those skilled in the art to which my invention appertains may know how to make and use my tank or vessel and fully understand its operation and advantages, I will proceed to describe the same, referring by letters to the accompanying drawings, in which—

Figure 1 is a side elevation of a settling-tank embodying the features of my invention, and Fig. 2 is a central section of the same.

Similar letters of reference indicate like parts in both figures of the drawings.

A is a tank of cylindrical or other desired shape in cross-section and composed of galvanized iron, wood, or other suitable material. When constructed of metal, the top B and bottom C may be formed with a flange D and secured in water-tight relation with the body of the tank by suitable rivets E. Near the bottom is arranged a cock F for drawing off the muddy or unclarified contents of the tank when desired, and at a sufficient altitude to be within the lowest horizontal plane or sphere of the clarified portion of the contents of the tank is arranged a cock G, by means of which the clarified portion of the contents may be withdrawn.

H is a manhole closed by a removable cover and which enables the tank to be cleaned thoroughly whenever an undue amount of precipitated matter has accumulated and which cannot be drawn off through the cock F.

Rising from the closed top B is arranged a tube I, and this tube is of such diameter and height as may be necessary to secure when the tank and the tube are filled hydrostatic pressure sufficient to hold the particles of water contained in the tank immovable relative to each other, and thus facilitate the ready precipitation of the mud contained in the fluid.

I have found from experiment and investigation with a tank of about five feet in diameter and eight feet high constructed according to my invention and filled with muddy water that in about five hours the muddy constituents will be precipitated to such an extent as to leave the contents above the medial line as clear water and which may be drawn off for use through the cock G. The cock G being located at about the base-line of the clear strata, all of such water may be drawn off and a fresh supply of water may be then introduced, and when desirable the portion of water below the cock G may be drawn off through the cock F. When the solid matter at the bottom has accumulated to such an extent as to render its removal necessary, the cover of the manhole H may be opened and such matter removed in an obvious manner. The height and diameter of the filling-tube I is such, as already stated, as to secure the results desired.

I do not wish to be limited to any exact dimensions of the tank or the degree of internal pressure or the material employed in the construction, nor to the exact location of the cocks F and G, so long as one shall be within the lower plane of the muddy water and the other in the lower plane of the clear water, the gist of my invention residing in the broad idea of providing the tank with means for removing the muddy and clear water and with additional means for filling and keeping full the tank and subjecting the contents to hydrostatic pressure sufficient to prevent the agitation of the contents of the tank and permit the precipitation of the heavy and foreign matter.

What I claim as new, and desire to secure by Letters Patent, is—

1. A reservoir or settling-tank having closed bottom and top, a vertical open tube extending above the plane of the top adapted to receive a column of water sufficient to keep the reservoir in a filled condition and to subject its contents to hydrostatic pressure, a cock near the horizontal medial line for drawing off the clear portion of the contents of the reservoir, and a cock at or near the bottom for drawing off the heavier or impure portion of the contents, substantially as hereinbefore set forth.

2. A reservoir or settling-tank having a closed bottom and top, a vertical open tube extending above the plane of the top adapted to receive a column of water to keep the reservoir in a filled condition and to subject its contents to hydrostatic pressure, a cock near the horizontal medial line for drawing off the clear portion of the contents of the reservoir, a cock at or near the bottom for drawing off the heavier or impure portion of the contents, and a fluid-tight manhole at or near the bottom for removing the precipitates from the fluid contents, substantially as hereinbefore set forth.

In testimony whereof I affix my signature in presence of two witnesses.

NATHANIEL S. SHALER.

Witnesses:
A. L. PICKETT,
LYMAN R. STANLEY.